US009223721B2

(12) United States Patent
Patel et al.

(10) Patent No.: US 9,223,721 B2
(45) Date of Patent: Dec. 29, 2015

(54) EMBEDDED PROCESSOR WITH VIRTUALIZED SECURITY CONTROLS USING GUEST IDENTIFICATIONS, A COMMON KERNEL ADDRESS SPACE AND OPERATIONAL PERMISSIONS

(75) Inventors: Sanjay Patel, San Ramon, CA (US); Ranjit Joseph Rozario, San Jose, CA (US)

(73) Assignee: ARM FINANCE OVERSEAS LIMITED, Cambridge (GB)

( * ) Notice: Subject to any disclaimer, the term of this patent is extended or adjusted under 35 U.S.C. 154(b) by 480 days.

(21) Appl. No.: 13/603,280

(22) Filed: Sep. 4, 2012

(65) Prior Publication Data
US 2014/0068138 A1 Mar. 6, 2014

(51) Int. Cl.
*G06F 12/10* (2006.01)
*G06F 12/14* (2006.01)

(52) U.S. Cl.
CPC ............ *G06F 12/109* (2013.01); *G06F 12/145* (2013.01); *G06F 12/1475* (2013.01)

(58) Field of Classification Search
CPC .. G06F 12/109; G06F 12/145; G06F 12/1475
See application file for complete search history.

(56) References Cited

U.S. PATENT DOCUMENTS

2012/0255015 A1* 10/2012 Sahita et al. .................... 726/24

* cited by examiner

*Primary Examiner* — Yong Choe
(74) *Attorney, Agent, or Firm* — Patterson Thuente Pederson, P.A.

(57) ABSTRACT

A method includes assigning unique guest identifications to different guests, specifying an address region and permissions for the different guests and controlling a guest jump from one physical memory segment to a second physical memory segment through operational permissions defined in a root memory management unit that supports guest isolation and protection.

12 Claims, 5 Drawing Sheets

EMBEDDED PROCESSOR WITH VIRTUALIZED SECURITY CONTROLS USING GUEST IDENTIFICATIONS, A COMMON KERNEL ADDRESS SPACE AND OPERATIONAL PERMISSIONS

FIELD OF THE INVENTION

This invention relates generally to microprocessors. More particularly, this invention relates to an embedded processor supporting virtualized security controls.

BACKGROUND OF THE INVENTION

A traditional computer operating system (OS) shares the resources of a single machine between multiple user programs or applications. The OS kernel controls all system resources, including execution time, access to instruction and data memory, I/O devices, and inter-process communication. A kernel is the smallest separately compiled unit of an OS that contains task scheduling functions.

The system resources typically include a microprocessor with at least two levels of privilege, a set of privileged machine-control instructions and registers, a virtual memory system using address translation, and an exception system. Kernel privilege is a state that allows all operations to be performed.

Virtualization is a technique by which multiple operating systems share a single machine. Each "guest" operating system runs within a virtual machine (VM), which appears to have the same privileged instructions, registers and I/O devices as the real machine, but this appearance is an illusion managed by a piece of software known as a hypervisor. The hypervisor is in full control of machine resources at all times. Guest operating systems no longer have unrestricted access to machine resources—they are "de-privileged". All operations performed by a guest must be explicitly permitted by the hypervisor.

The hypervisor is responsible for sharing system resources between multiple VMs, and maintaining the expected behavior of each VM. The hypervisor performs the same basic functions as the traditional OS kernel, except that the hypervisor's clients are full operating systems rather than user applications.

FIG. 1 illustrates a prior art virtualization system 100. The system 100 includes a first set of applications 102_1 through 102_N executing on a first operating system 104, and a second set of applications 106_1 through 106_N operating on a second operating system 108. A hypervisor 110 operates between the operating systems 104 and 108 and a set of hardware resources 112_1 through 112_N. In particular, the hypervisor 110 controls access to the hardware resources 112 while executing functions specified by the applications. The hardware resources 112 may be a central processing unit, a graphics processing unit, memory, input/output devices, and the like.

The traditional approach to virtualization for a microprocessor with two levels of privilege (e.g., user and kernel) is known as de-privileging. With de-privileging, a guest operating system kernel is executed in user mode instead of the expected kernel mode. Accesses to a privileged resource from the guest kernel results in an exception (trap) that is handled (emulated) by the hypervisor. This scheme is possible if all privileged operations result in exceptions when executed from user mode, and the full user-mode address space can be translated. The performance of such a trap-and-emulate system is limited by the many hypervisor exceptions that must be processed.

The system of FIG. 1 is successfully deployed in connection with various microprocessor architectures that have significant computational resources. A class of microprocessors, known as microcontrollers or embedded processors, does not have significant computational resources. Microcontrollers are used in automatically controlled products and devices, such as automobile engine control systems, implantable medical devices, remote controls, office machines, appliances, power tools, toys and other embedded systems. One use case for virtualization as described in connection with FIG. 1 is consolidation of workloads from multiple systems.

It would be desirable to utilize virtualization techniques in connection with microcontrollers. Such virtualization techniques must be minimalistic in view of the limited computational and memory resources associated with a microcontroller. Such virtualization techniques should also be operationally consistent with other virtualization techniques supported by more powerful processors in a common processor architecture so as to promote uniformity and consistency across a common processor architecture. Virtualization in this context would provide security whereby different address spaces are isolated and are therefore protected from one another.

SUMMARY OF THE INVENTION

A computer readable storage medium includes executable instructions to define a microcontroller with a root memory management unit storing guest identifications to de-alias different contexts associated with a common operating system, guest physical addresses in an address space shared by all guests, and operational permissions for guests in the address space shared by all guests.

A computer readable storage medium includes executable instructions to define a root monitor as root software with a sub-set of hypervisor virtualization functionality to support security for multiple guests using a common operating system.

A method includes assigning unique guest identifications to different guests, specifying an address region and permissions for the different guests and controlling a guest jump from one physical memory segment to a second physical memory segment through operational permissions defined in a root memory management unit that supports guest isolation and protection.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
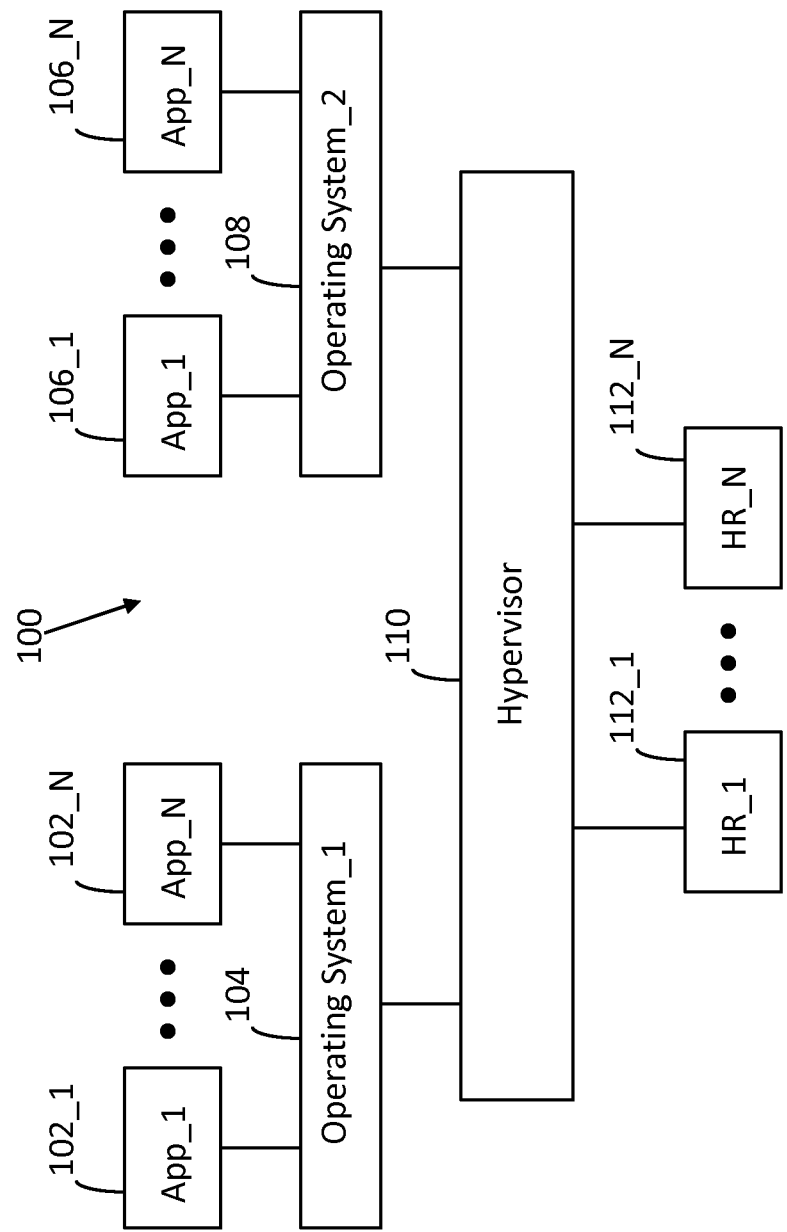
FIG. 1 illustrates a prior art virtualization system.
Figure 2:
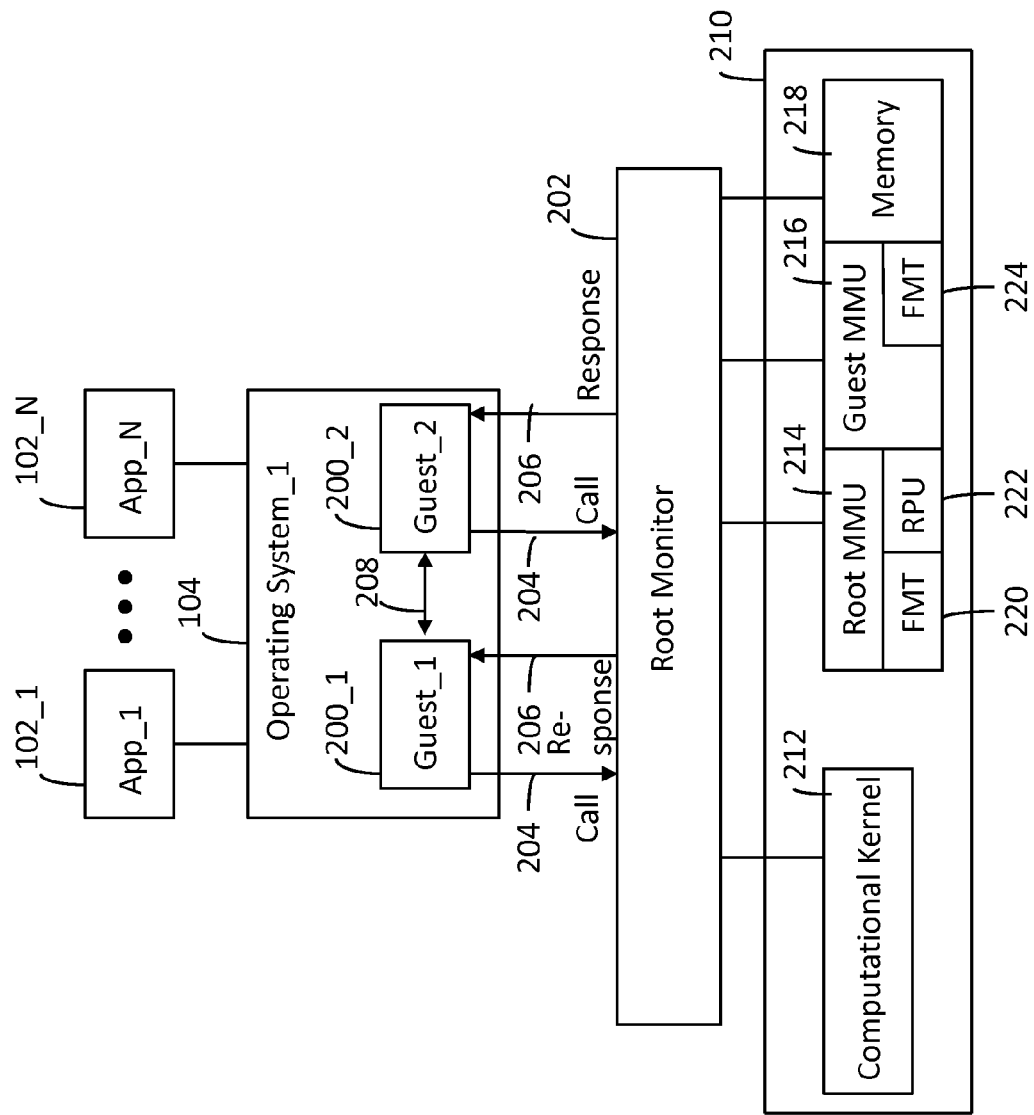
FIG. 2 illustrates a system configured in accordance with an embodiment of the invention.

FIG. 2 illustrates a system configured in accordance with an embodiment of the invention. A set of applications 102_1 through 102_N are executed by a single operating system 104. Application 102_1 results in a first guest process 200_1 in operating system 104, while Application_N results in a second guest process 200_2 in operating system 104.

In the case of a microcontroller of an embedded system, a first application may be application code from an original equipment manufacturer (OEM), and a second application may be third-party code, such as a math library. The OEM and the owner of the third-party code each want to prevent the other from access to proprietary code. Thus, isolation between these code stacks must be maintained. The disclosed technology achieves this isolation through a root monitor 202 that implements a sub-set of virtualization functionality traditionally associated with a hypervisor 110. The root monitor 202 is software that operates at root privilege and controls the operation of guest software operating at lower privilege. The root monitor may be viewed as a simplified hypervisor, as discussed below.

In a fully virtualized system, each guest is typically associated with a different operating system. However, in this case, full microprocessor resources are not available. Rather, a microcontroller is involved, such as an embedded processor associated with an embedded system. Thus, a single operating system is used. In this configuration, different guests of the single operating system are treated liked different guests from different operating systems in a fully virtualized hypervisor. In particular, a root monitor 202 operates as a minimalistic hypervisor. In one embodiment, the root monitor 202 is root software executing in root unmapped space. The microcontroller in this case does not need to implement a different version of the virtualization architecture. The root software distinguishes the use case.

A guest may make calls or hypercalls 204 to the root monitor 202, which processes the call and supplies a response 206. As root software, the root monitor 202 has visibility into all actions. Guest-to-guest calls may be made through the root monitor 202. However, such calls are relatively expensive because they involve context switches. A context switch is the task of changing a software environment from one task to another task in a multitasking operating system (OS). Each task has associated state that must be transferred.

In accordance with an embodiment of the invention, guest-to-guest jumps 208 are directly supported without invocation of the root mode and an associated context switch. Guest identifications (e.g., Guest_1 200_1 and Guest_2 200_2) are used to de-alias different contexts in the same operating system. The address space is common to all of the guests. More particularly, code segments associated with different guests are in a common kernel address space. For example, in the MIPS® Architecture from MIPS® Technologies, Sunnyvale, Calif., kseg0 is for cached references and kseg1 is for uncached references. Standalone programs or programs using simple OSs typically run in kseg0/kseg1.

As shown in FIG. 2, a microcontroller or embedded processor 210 has a computational kernel 212, a root memory management unit (MMU) 214, a guest MMU 216 and memory 218 (the memory 218 may internal or external to the microcontroller 210). The root MMU 214 has a fixed mapping table 220 and a root protection unit 222, as discussed below. The guest MMU 216 has a fixed mapping table 224 to provide physical addresses. The guest physical addresses correspond to root physical addresses since the root MMU 214 does not provide an additional address translation.

Guest address translation goes through the fixed mapping table 224 of the guest MMU 216 and then the root protection unit 222 of the root MMU 214. Root address translation goes through the fixed mapping table 220 and the root protection unit 222 of the root MMU 214. Root addresses are always mapped as valid in the root protection unit 222. Thus, the root protection unit 222 is shared between root and guest address translations.

Figure 3:
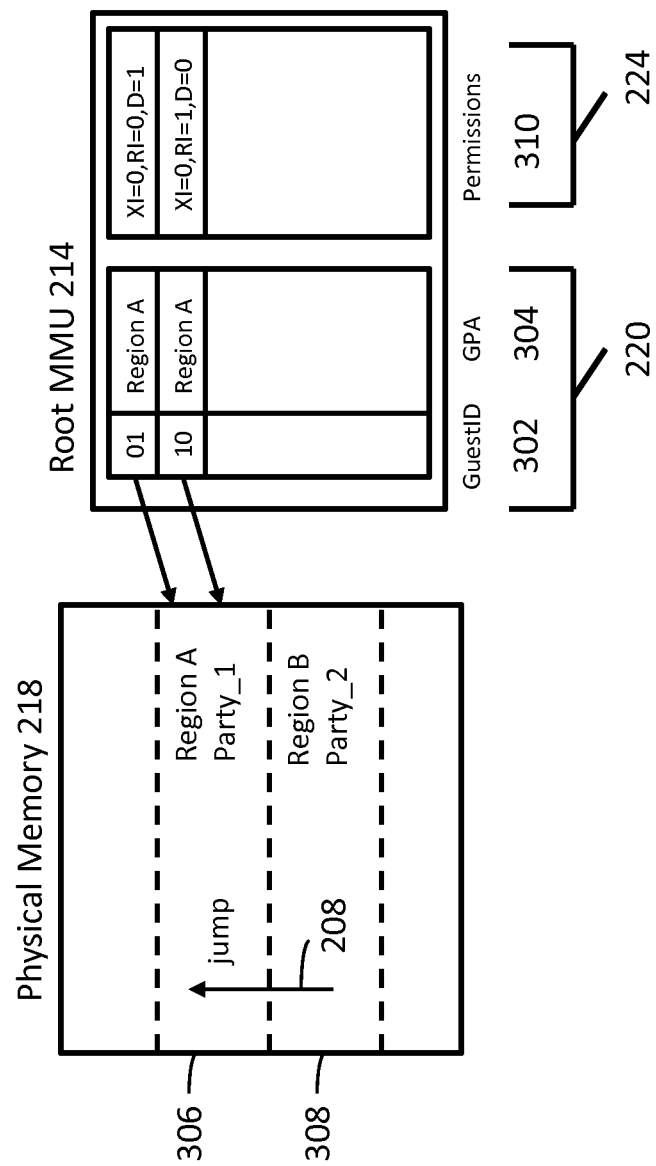
FIG. 3 illustrates a root memory management unit configured in accordance with an embodiment of the invention.

FIG. 3 illustrates a root MMU 214 and associated physical memory 218. The root MMU stores guest identifications (GuestID) 302 and associated guest physical addresses 304; this is the tag section of the MMU, which forms a mapping region. Observe here that guest information is stored in the root MMU; typically there is a separate guest MMU for such information. Guest processes typically have processing restrictions that do not apply to root processes. The invention implements guest processing restrictions in the root MMU through a set of permissions, as discussed below.

In the example of FIG. 3, a first memory region 306 is reserved for code from a first party (Party_1), while a second memory region 308 is reserved for code from a second party (Party_2). All code is executed in an unmapped kernel mode. The root MMU 214 provides code isolation and protection. In particular, permissions 310 specify operations that may be performed between code segments. For example, an effective jump 208 is achieved through settings in the root MMU 214. In particular, the first GuestID (01) is mapped to region 306, as is the second GuestID (10). A jump 208 is controlled through operational permissions 310. In one embodiment, the operational permissions are defined by an Execute Inhibit (XI), a Read Inhibit (RI) and a Dirty bit (D), which operates as a write enable. In the example of FIG. 3, Party_2 (GuestID 10), can jump into region 306 because it has execute permission (XI=0 or execute inhibit is not enabled). However, it cannot read (RI=1 or Read Inhibit enabled) or write (D=0 or write enable disabled) in this region. If a mapping does not exist, then an attempted jump results in a trap to the root monitor 202. Thus, the root protection unit 222 qualifies any guest address and protects different address spaces from each other even though each guest operates at the same privilege. The root protection unit 222 may be viewed as a reduced form of a translation look-aside buffer, which is appropriate in cost and application for an embedded processor. The disclosed protective technique is possible in an implementation that supports virtualization.

In one embodiment, permissions are set by the root monitor 202. The permissions may specify direct guest-to-guest jumps or may require a guest to make a call to another guest through the root. A trap to the root occurs on an invalid access to the root protection unit 222.

Thus, different regions of physical memory have different guest permissions 310 as defined in the root MMU 214. Consequently, different kernel sections operate in the same virtual machine associated with a single operating system.

The permissions 310 form a portion of a root protection unit 224. The root protection unit 224 outputs permissions, instead of a physical address, as in the case of a translation look-aside buffer. The root protection unit 224 does not translate the guest physical address received from the fixed mapping table 224 of the guest MMU 216. Consequently, guest physical addresses correspond to root physical addresses.

The privilege settings reduce latency for one guest to access another guest because a call to the root and an associated context switch is not required. Guest-to-guest access through the root monitor root software is also possible, but this approach is slower since a context switch is involved. The specified guest-to-guest access through the guest permissions 310 avoids the computational expense of a context switch.

Each MMU may also be configured to include a translation look-aside buffer and a cache. In this case, the fixed mapping table 224 of the guest MMU 216 becomes a guest translation look-aside buffer and the RPU 222 of the root MMU 214 becomes a full root translation look-aside buffer.

Figure 4:
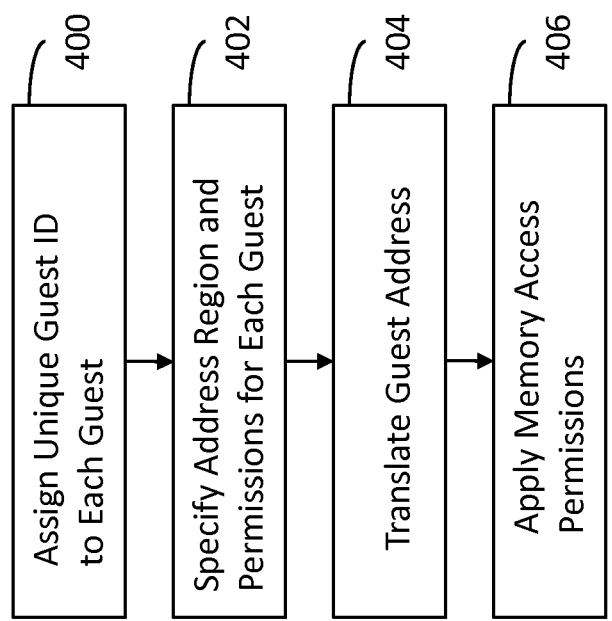
FIG. 4 illustrates processing operations associated with an embodiment of the invention.

FIG. 4 illustrates processing operations associated with an embodiment of the invention. A unique guest ID is assigned to each guest 400. Root software may implement this operation.

An address region and permissions are specified for each guest 402. Root software may also implement this operation. For example, first and second code segments 306 and 308 in different physical memory segments are shown in FIG. 3. The code segments are associated with guest identification values 402. Guest IDs 302 are also shown in FIG. 3. Each guest ID 302 has an associated guest physical address region 304, as shown in FIG. 3

A guest address is then translated 404. For example, the fixed mapping table 224 of the guest MMU 216 may perform this operation. Memory access permissions are then applied 406. That is, the root MMU 214 uses the root protection unit 222 to apply permissions. For example, a guest jump from one physical memory segment to a second physical memory segments is controlled through permissions 310. As shown in FIG. 3, in one embodiment, the operational permissions include an execute inhibit (XI), a read inhibit (RI) and a dirty bit (D) for write enable control.

Figure 5:
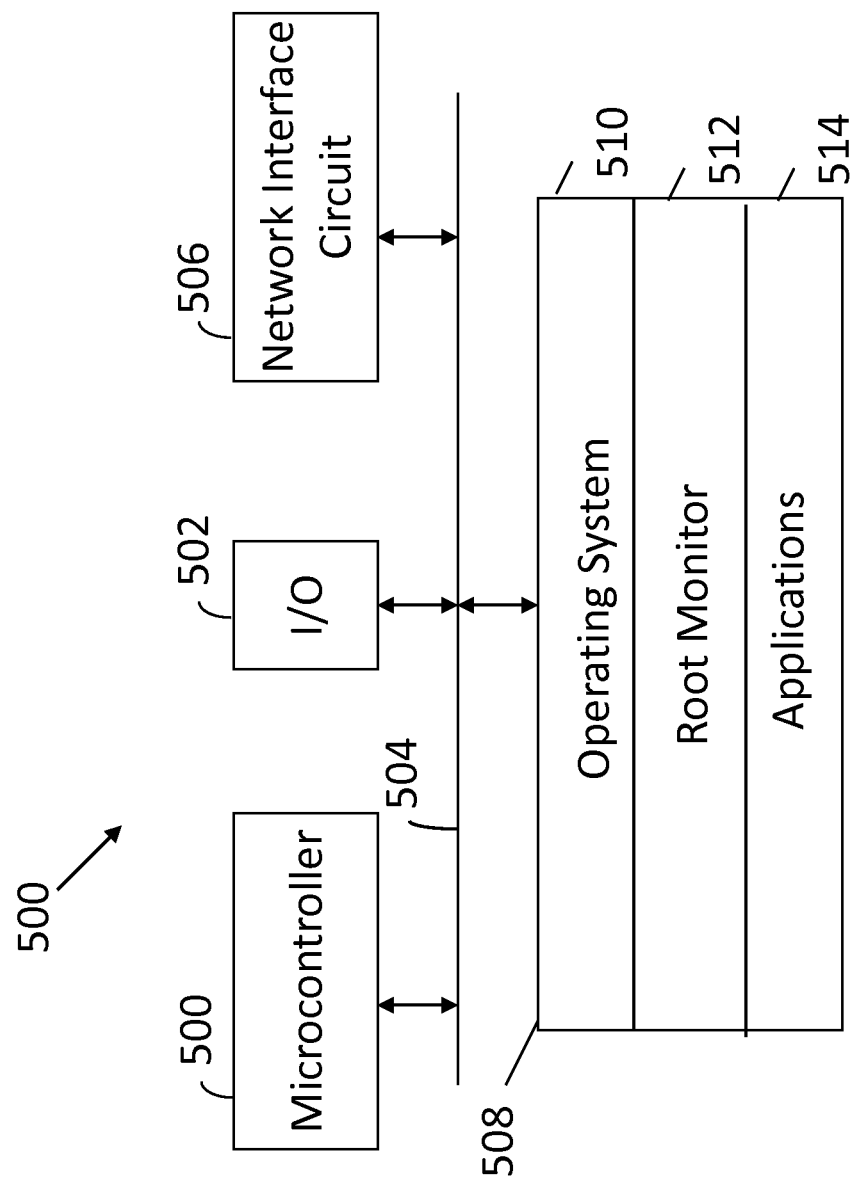
FIG. 5 illustrates an embedded system configured in accordance with an embodiment of the invention.

FIG. 5 illustrates an embedded system 500 incorporating the techniques of the invention. The embedded system 500 includes a microcontroller 500, which may correspond to the microcontroller 210 of FIG. 2. The microcontroller 500 is connected to input/output devices 502 over a bus 504. The input/output devices 502 may include input signal ports, output signal ports, a keypad, a display and the like. Optionally, a network interface circuit 506 may be connected to the bus 504 to provide interconnectivity with a network (not shown).

A memory 508 is also connected to the bus 504. The memory 508 may be a combination of Read Only Memory (ROM) and Random Access Memory (RAM). The memory 508 stores an operating system 510, root monitor 512 and one or more applications 514. In one embodiment, the root monitor has a relatively small code footprint which is loaded into RAM from ROM.

Thus, the invention provides isolation and protection for different physical address ranges associated with a guest ID. The system is flexible since it allows guest-to-guest transitions through the root monitor root software or through reliance upon permissions defined in the root MMU. The disclosed techniques provide security through virtualization across different processor architectures. The utilization of the disclosed permissions avoids context switching, reduces scheduling overhead and avoids dynamic management of address spaces.

This approach stands in contrast to prior art techniques that rely upon secure address spaces and unsecure address spaces. A single address space is used with security being provided by the guest identification and specified permissions working in conjunction with the root monitor 512, which is operative as a reduced functionality hypervisor implemented as root software executing in root unmapped space. Consequently, virtualization techniques are operative as a security solution.

While various embodiments of the invention have been described above, it should be understood that they have been presented by way of example, and not limitation. It will be apparent to persons skilled in the relevant computer arts that various changes in form and detail can be made therein without departing from the scope of the invention. For example, in addition to using hardware (e.g., within or coupled to a Central Processing Unit ("CPU"), microprocessor, microcontroller, digital signal processor, processor core, System on chip ("SOC"), or any other device), implementations may also be embodied in software (e.g., computer readable code, program code, and/or instructions disposed in any form, such as source, object or machine language) disposed, for example, in a computer usable (e.g., readable) medium configured to store the software. Such software can enable, for example, the function, fabrication, modeling, simulation, description and/or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.).

It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

What is claimed is:

1. A non-transitory computer readable storage medium, comprising executable instructions to define a microcontroller with:
   a root memory management unit storing guest identifications to de-alias different contexts associated with a common operating system, guest physical addresses in an address space shared by all guests, and operational permissions for guests in the address space shared by all guests, and wherein a guest jump from a first physical memory segment to a second physical memory segment is controlled through the operational permissions.

2. The non-transitory computer readable storage medium of claim 1 wherein the address space shared by all guests is a common kernel address space.

3. The non-transitory computer readable storage medium of claim 1 further comprising a computational kernel to enable guest transitions without a context switch by setting the operational permissions.

4. The non-transitory computer readable storage medium of claim 1 wherein guest physical addresses correspond to root physical addresses.

5. The non-transitory computer readable storage medium of claim 1 wherein the operational permissions for guests include a read inhibit, a write enable and an execute inhibit.

6. The non-transitory computer readable storage medium of claim 1 further comprising a computational kernel to execute a root monitor in root unmapped space.

7. The non-transitory computer readable storage medium of claim 1 wherein the root memory management unit includes a root protection unit.

8. The non-transitory computer readable storage medium of claim 1 wherein the root memory management unit includes a translation look-aside buffer.

9. A method, comprising:
   assigning unique guest identifications to different guests;
   specifying an address region and permissions for the different guests; and
   controlling a guest jump from a first physical memory segment to a second physical memory segment through operational permissions defined in a root memory management unit that supports guest isolation and protection, wherein the root memory management unit is configured to de-alias different contexts associated with a common operating system, wherein the different contexts are defined by different address spaces.

10. The method of claim 9 wherein the physical memory segments are shared by all guests in a common kernel address space.

11. The method of claim 9 wherein the operational permissions include read inhibit, write inhibit and execute inhibit.

12. The method of claim 9 wherein the physical memory segments have root physical addresses that correspond to guest physical addresses obtained from a fixed mapping table of a guest memory management unit.

* * * * *